(12) United States Patent
Katagiri et al.

(10) Patent No.: US 8,526,136 B2
(45) Date of Patent: *Sep. 3, 2013

(54) METHOD AND SYSTEM FOR DETERMINING ACCESS SEQUENCE OF DATA STORED ON A TAPE MEDIUM

(75) Inventors: Takashi Katagiri, Yokohama (JP); Setsuko Masuda, Yokohama (JP); Yuhko Mori, Yokohama (JP); Hirokazu Nakayama, Fujisawa (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/970,631

(22) Filed: Dec. 16, 2010

(65) Prior Publication Data

US 2012/0154946 A1    Jun. 21, 2012

(51) Int. Cl.
*G11B 5/55* (2006.01)
*G11B 15/18* (2006.01)
*G11B 15/48* (2006.01)

(52) U.S. Cl.
USPC ....... 360/78.02; 360/72.1; 360/74.4; 711/111

(58) Field of Classification Search
None
See application file for complete search history.

(56) References Cited

U.S. PATENT DOCUMENTS

| 4,858,039 A | * | 8/1989 | Mintzlaff | 360/72.2 |
| 6,349,356 B2 | * | 2/2002 | Basham et al. | 711/111 |
| 6,763,427 B1 | * | 7/2004 | Doi et al. | 711/111 |
| 2006/0164744 A1 | * | 7/2006 | Greco et al. | 360/55 |

* cited by examiner

*Primary Examiner* — Andrew L Sniezek
(74) *Attorney, Agent, or Firm* — Griffiths & Seaton PLLC

(57) ABSTRACT

For determining an access sequence of a plurality of data groups stored on a tape medium, a first data group in the access sequence is selected based on which data group in the plurality of data groups has a beginning closest to a current position of the tape medium. A second data group in the access sequence is selected based on which remaining data group in the plurality of data groups has a beginning closest to an end of the first data group in the access sequence.

8 Claims, 5 Drawing Sheets

US 8,526,136 B2

METHOD AND SYSTEM FOR DETERMINING ACCESS SEQUENCE OF DATA STORED ON A TAPE MEDIUM

BACKGROUND OF THE INVENTION

1. Field of the Invention

The present invention relates in general to computers, and more particularly to apparatus and computer program products for determining the access sequence of data stored on a tape medium.

2. Description of the Related Art

As technology develops, the storage capacity of tape media (e.g., tape drive) continues to grow. Recent advances have led to some tape media having a capacity of 1.5 terabytes (TB). With this increased tape media capacity, tape media may be used in a wide range of applications, from traditional data backup and archiving to file systems.

Tape media, such as tape drives, compare favorably with hard disks in terms of capacity and transfer rate, but finding data dispersed on tape media, which may reach lengths of several hundreds of meters, often requires minutes of data seek time. Drive seek time has long been considered an important issue, and many methods for reducing seek time for various forms of data have been proposed.

In order to be viable for some modern applications, tape drives may need to be able to consecutively read multiple files or logical volumes (e.g., record groups), a process often referred to as "defrag" or "reclamation." This poses the new challenge of reducing total seek time when accessing multiple record groups in succession. One potential way of reducing total seek time while still maintaining shortened seek times for isolated seek operations is to modify the access sequence for the record groups. Using this method to reduce total seek time depends heavily on a variety of conditions that are unique to tape drives, including the speed and acceleration at which the tape drive moves the tape media, as well as total data band transport time, which makes access sequence modification ideal for tape drives. In order to modify the access sequence on a tape drive and minimize the amount of processing time required for modification, an algorithm with a low computational complexity is required.

SUMMARY OF THE DESCRIBED EMBODIMENTS

In one embodiment, a method is provided for determining an access sequence of a plurality of data groups stored on a tape medium. A first data group in the access sequence is selected based on which data group in the plurality of data groups has a beginning closest to a current position of the tape medium. A second data group in the access sequence is selected based on which remaining data group in the plurality of data groups has a beginning closest to an end of the first data group in the access sequence.

In another embodiment, a computer system is provided. The computer system includes a computer-readable medium and a processor in operable communication with the computer-readable medium. The processor is adapted to select a first data group in an access sequence of a plurality of data groups stored on a tape medium based on which data group in the plurality of data groups has a beginning closest to a current position of the tape medium and select a second data group in the access sequence based on which remaining data group in the plurality of data groups has a beginning closest to an end of the first data group in the access sequence.

In a further embodiment, a computer program product is provided for determining an access sequence of a plurality of data groups stored on a tape medium. The computer-readable storage medium has computer-readable program code portions stored thereon. The computer-readable program code portions include a first executable portion for selecting a first data group in the access sequence based on which data group in the plurality of data groups has a beginning closest to a current position of the tape medium and a second executable portion for selecting a second data group in the access sequence based on which remaining data group in the plurality of data groups has a beginning closest to an end of the first data group in the access sequence.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Embodiments of the present invention provide methods, computer systems, and computer program products for determining the access sequence of data stored on a tape medium.

According to one aspect of the present invention, based on the fact that a file system or virtual tape server (VTS) may read multiple record groups in any given order, a new concept, the distance between record groups, is defined which may be used to modify the record group access sequence and thus reduce total seek time. In simulation testing, this method significantly reduces total seek time at a low computational capacity, especially when large quantities of record groups were involved.

Figure 1:
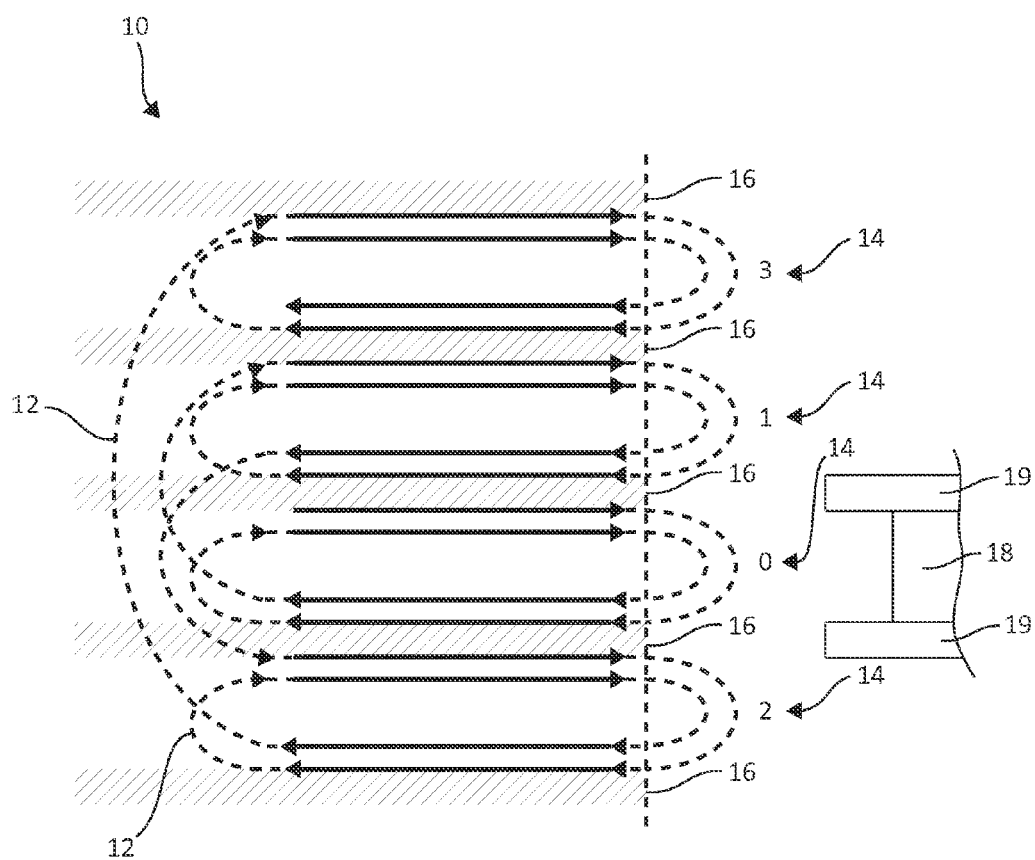
FIG. 1 is a cross-sectional view of a tape cartridge according to one embodiment of the present invention.

FIG. 1 illustrates a tape cartridge (or tape drive cartridge) 10 according to one embodiment of the present invention. The tape cartridge 10 includes a tape media (or tape) 12. In one embodiment, the tape media 12 has a width (i.e., in the horizontal direction)) of approximately 1.25 centimeters (cm) and a length (i.e., in the longitudinal direction) of approximately 800 meters (m). As shown, the tape media 12 is divided into four data bands 14, which are essentially long, thin areas sandwiched between servo bands 16 (FIG. 1). The data bands 14 are numbered (0-3), indicating the order in which they are used. Although not shown, data referred to as a "servo pattern" is written into the servo bands 16 to control the locations of read/write heads 18 (along with servo band heads 19), which read and write data. As shown, the servo band heads 19 are positioned on the sides of the read/write heads 18. Although only one object is shown, there may be sixteen read/write heads 18. In modern tape media systems, the time required to move a head in a data band laterally is relatively short, but it may take several seconds to move the head to the adjacent data band.

To write data to tape media, an application requests the tape drive to write data in records, which may range from several bytes to several megabytes (MB) in size. When written to the tape media 12, the records receive unique record numbers, which are used to designate the data to be read when the application attempts to access the data from the tape media. The files used in file systems, and the logical volumes used in VTSs, are made up of multiple records. The tape drive repacks records received from the application into fixed-length packages (e.g., approximately 2.4 MB) known as data sets (DS), which are then written to the tape media.

In one embodiment, the tape drive system uses sixteen heads, arranged in a parallel fashion, to write the data sets to the tape media in data set fragments, which may measure several micrometers (μm) in width and approximately 10 cm in length. To write enough data to fill a tape media to capacity, the heads must complete dozens of forward and reverse passes across the tape media 12, depending on the number of wraps in the tape media. Data set capacity and size, tape length, and wrap count may vary.

The tape media 12 may contain, for example, between several million and 10 million records. As a result, it is very difficult to maintain information corresponding to the physical location of every record on the media. In order to efficiently search records written to the tape media, sets of non-volatile cartridge memory (e.g., 4 KB or 8 KB sets) on the tape cartridge are used to store a tape directory (i.e., the ranges of record numbers present on each wrap and perform seek operations).

One way to reduce total seek time when consecutively accessing multiple record groups is to modify the record group access sequence. Essentially, this is an non-deterministic polynomial-time (NP-hard) problem, as is commonly understood, in combinatorial optimization, similar in many ways to the "traveling salesman problem." However, in the traveling salesman problem, the traveling cost from point A to point B is the same as the traveling cost from point B to point A. In the multiple record group access sequence problem, record groups are long, meaning that the traveling cost from the end of record group A to the beginning of record group B is different than the traveling cost from the end of record group B to the beginning of record group A.

In accordance with one aspect of the present invention, the traveling cost is conceived as the distance between record groups. By using this concept and combining newly developed nearest neighbor and pairwise exchange algorithms (described below) to establish the record group access sequence total seek time may be reduced.

The distance between record groups is defined as a representation of record group traveling cost. This distance does not refer to the physical distance between record groups stored on tape media, but rather to the time required to move between record groups. The distance between record group A and record group B (t(A,B)) is primarily affected by the following two factors: tL(A,B), time required for movement along the longitudinal direction of the tape media (the longer direction) and tD(A,B), the time required for movement on the data band.

Thus, the distance between record groups A and B t(A,B) may be defined as $$t(A,B) = tL(A,B) + tD(A,B) \tag{1}$$

Variables for determining tL(A,B) include: IE(A), the distance between the beginning of the tape media and the end of record group A; IS(B), the distance between the beginning of the tape media and the beginning of record group; Bs(A), the tape media transport speed when reading record group A; s(B), the tape media transport speed when reading record group B; sR, the tape media transport speed when performing seek operations; a, tape media acceleration; IR(A), the distance moved when shifting from s(A) to sR; and IR(B), the distance moved when shifting from sR to s(B).

Using the above variables, the time required for movement along the longitudinal direction of the tape media, tL(A,B) may be expressed in the following formula. However, it is assumed that the distance between IE(A) and IS(B) is long enough so that they may not be reached during acceleration and deceleration. When the distances are too short, the variables are considered self-evident and may be eliminated.

$$tL(A,B) = |sR-s(A)|/a + (|IE(A)-IS(B)|-IR(A)-IR(B))/sR + |sR-s(B)|/a. \tag{2}$$

Variables for determining tD(A,B) include: tD, the time required to move to the adjacent data band and d(A,B), the function that returns the number of data bands passed when seeking from the end of record group A to the beginning of record group B.

Using the above variables, the time required for movement on the data band tD(A,B) may be expressed as the product of tD and d(A,B) as $$tD(A,B) = tDd(A,B). \tag{3}$$

If the number of record groups to be accessed is relatively small (e.g., ten), a brute-force method may be applied to analyze every access sequence combination and calculate the total seek time (i.e., the total distance between record groups in each access sequence). The access sequence that produces the shortest total seek time would thus be the most effective choice. However, when more record groups are involved, calculating the total seek time for every possible combination requires a much higher level of computational effort that makes it very difficult to establish an access sequence within a realistic amount of time.

By developing, combining, and applying new incarnations of the nearest neighbor and pairwise exchange algorithms (or methods), the amount of time required to establish an access sequence for large quantities of record groups may be limited. Total seek time may also be reduced more effectively than approaches that access the groups randomly or in order of record number.

Figure 2:
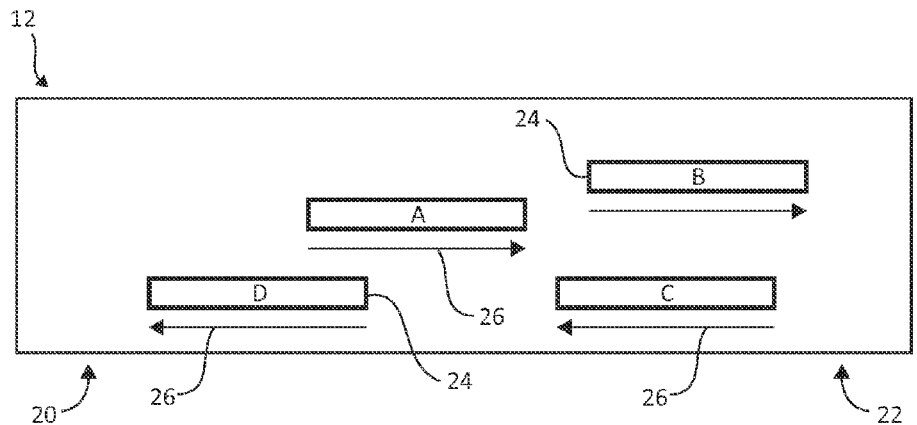
FIG. 2 is a schematic plan view of a tape medium within the tape cartridge of FIG. 1.

FIG. 2 illustrates the tape medium 12 of FIG. 1 and may be used to illustrate the nearest neighbor method and the pairwise exchange method which are described below. The tape medium 12 includes a beginning (i.e., beginning of tape) section 20 and end (i.e., end of tape) section 22 and has four record groups 24 (i.e., record group A, record group B, record group C, and record group D) written thereon. Arrows 26 indicate the direction in which each of the record groups 24 are written and/or read.

Figure 3:
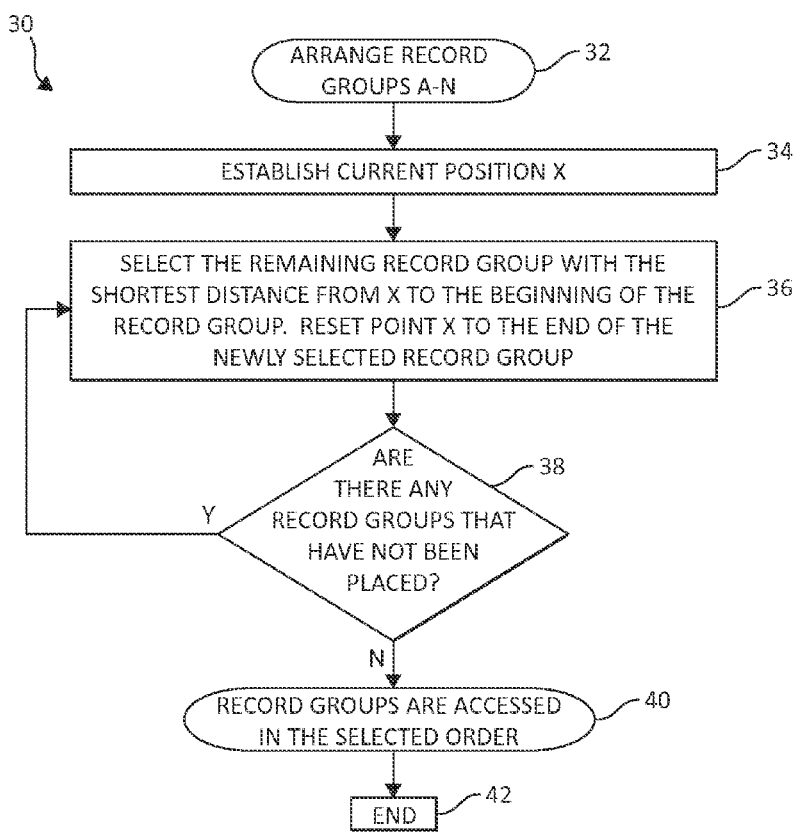
FIGS. 3 and 4 are flow charts illustrating methods according to various aspects of the present invention.

FIG. 3 illustrates the nearest neighbor method 30, according to one embodiment of the present invention. At step 32, the method 30 begins with the record groups 24 (i.e., record groups A-n) arranged as shown in FIG. 2. At step 34, the tape medium 12 (FIG. 2) position is established. In one embodiment, the tape medium is positioned at the beginning 20 (i.e., a head of the tape medium system is positioned at the beginning 20).

At step 36, the record group 24 which starts (i.e., depending on the read/write direction 26) is closest to the current position is selected as the first record group 24 to be read. In the example shown in FIG. 2, record group A is selected at it starts closest to the beginning section 20 of the tape medium 12. Also at step 36, the tape position is reset to the end of the selected record group 24.

At step 38, if there are remaining record groups 24 that have not been placed in the record sequence, the method 30 returns to step 36. In the example shown in FIG. 2, the record group whose beginning is closest to the end of record group A is record group B. Thus, in this example, record group B is chosen as the second group in the access sequence, and the tape position is reset to the end of record group B.

At step 38, the method 30 again returns to step 36, as there are remaining record groups 24 that have not been placed in the record sequence. At step 36, record group C is selected next as it starts closest to the end of record group B. The method continues as such until all of the record groups 24 are placed in the access sequence. In this example, the last record group 24 in the sequence is record group D.

At step 38, if all of the record groups 24 have been placed in the access sequence, the method 30 continues to step 40 where the record groups 24 are accessed in the selected order of the access sequence, after which the method 30 ends at step 42.

Thus, with the nearest neighbor algorithm, the record group 24 having the shortest distance between record groups 24 from the current position is selected to be the first group in the access sequence. Then, the record group 24 having the shortest distance between record groups 24 from the end of the first record group is then selected to be second in the sequence. This process continues until all of the record groups 24 have been placed.

The nearest neighbor method provides much shorter record group seek time in the first half of the sequence, but may not significantly reduce seek time in the second half.

Figure 4:
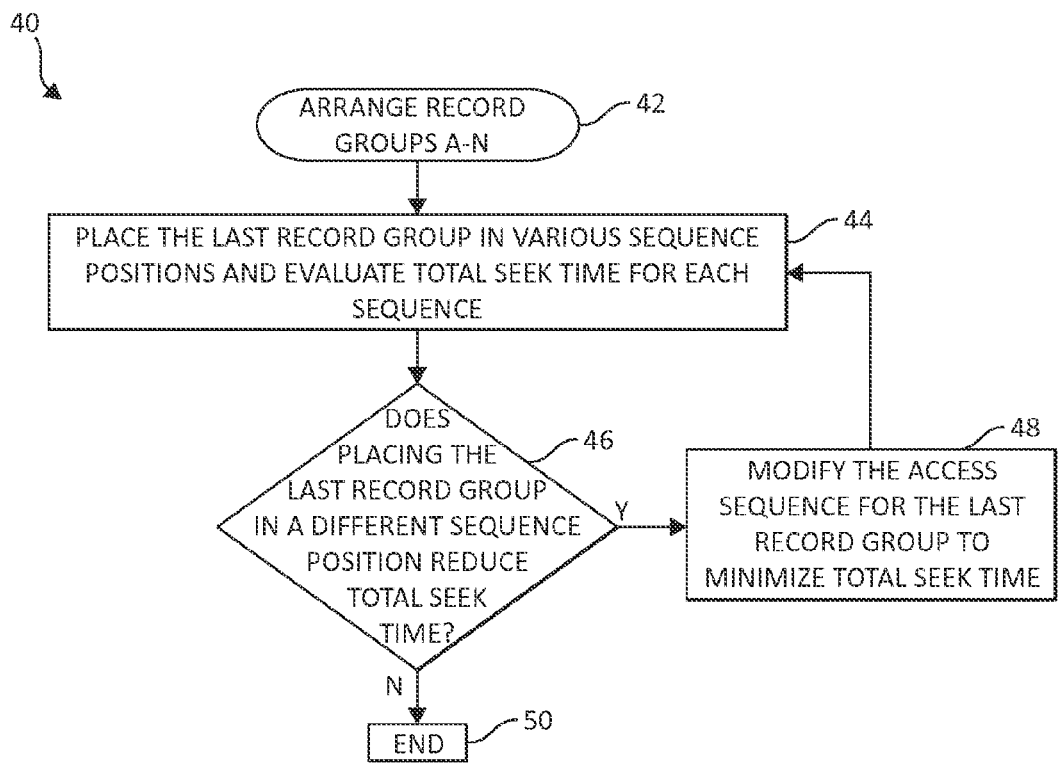

FIG. 4 illustrates the pairwise exchange method 40 which may be used to modify the access sequence generated by the nearest neighbor method 30, according to one embodiment of the present invention.

The method 40 begins at step 42 with the record groups 24 being arranged in the order of the access sequence as determined by the nearest neighbor method 30 of FIG. 3. For this example, the access sequence determined by the nearest neighbor method 30 may be assumed to be ABCD (i.e., A is accessed first, B is accessed second, C is accessed third, and D is accessed last).

At step 44, the last record group in the access sequence (e.g., record group D) is placed in all possible sequence positions and the total seek time for each of the possible sequences is calculated. Thus, the total seek time is calculated for each of the access sequences DABC, ADBC, ABDC, and ABCD.

At step 46, if placing the last record group in a position different than that determined by the nearest neighbor method 30 reduces total seek time, the method 40 continues to step 48. At step 48 the access sequence with the shortest seek time is used to modify the access sequence that is to be used as the method returns to step 44. As an example, it may be assumed that access sequence DABC provided the shortest seek time. Thus, when returning to step 44, DABC is used.

Thus, at step 44, record group C, which now occupies the last spot in the sequence, is placed in all possible sequence positions to evaluate total seek time. The different sequences then become CDAB, DCAB, DACB, and DABC.

At step 46, if the sequence with the shortest total seek time is DABC, the method 40 proceeds to step 50. This is the case because this result matches the most recent result (from Step 2). Thus, DABC is chosen as the optimal read sequence (in addition to the last element of the sequence, the last n elements of the sequence may be rearranged, as well. The nearest neighbor exchange method may also be applied where the distance between record groups is the longest. At step 50, the method 40 ends with, for example, the record groups 24 being accessed in the order of the latest modified access sequence.

Thus, in the pairwise exchange method, the record group in the access sequence's final position (or last several positions) is placed in different access sequence positions, and the access sequence that produces the shortest total seek time is chosen. This process is repeated until the record group in the sequence's final position no longer changes. The pairwise exchange method may improve group seek time in the second half of the access sequence.

In order to assess the effectiveness of the above methods for reducing total seek time, a simulation environment was created. The simulation may be divided into the four sections: input generation, distance between record groups calculation, record group access sequence modification section, and total seek time display.

In the input generation section, random values for five elements were generated for each record group. The five elements included the longitudinal position of the beginning of the record group, the longitudinal position of the end of the record group, the data band containing the record group, the direction in which the tape media moves when reading the beginning of the record group, and the direction in which the tape media moves when reading the end of the record group.

To simplify the model, it was assumed that the beginning and end of each record group always exist on the same data band. In addition, the number of record groups was allowed to fluctuate between 8 and 1,024 due to the fact that the total number of record groups may affect the method's effectiveness. Furthermore, in order to prevent variations in effectiveness caused by the positional relationships of the record groups, the method was evaluated by generating 1,000 sets of relationships for each record group quantity and comparing average total seek time.

In the distance between record groups calculation section, in order to simplify calculation, the time required for acceleration, deceleration, and the distance covered during those times were ignored. Instead, the time required to move in the longitudinal direction between record groups, the time required to move between data bands, and the time required to change tape transport direction were calculated. Those values were then totaled to find the distance between record groups.

In the record group access sequence modification section, the access sequence for multiple record groups created in the input generation section was modified based on three principles: the brute-force method, the nearest neighbor method combined with the pairwise exchange method, and the record number sequence.

When changing to the record number sequence, each record group was placed according to data band number. Groups with the same data band number were accessed in the order created in the input generation section.

In the total seek time display section, the total seek time and the time required to modify the access sequence when records were consecutively accessed according to the sequence established in the record group access sequence modification section were displayed.

First, the time required to modify the access sequence when using the brute-force method was compared with a method that combines the nearest neighbor method and the pairwise exchange method (the present method described herein). The results are shown in Table 1.

TABLE 1

Time required to modify access sequence

| Number of record groups | Brute-force method (seconds) | Present method (seconds) |
|---|---|---|
| 8 | 0 | 0 |
| 9 | 1 | 0 |
| 10 | 8 | 0 |
| 11 | 91 | 0 |
| 128 | n/a | 0 |
| 1024 | n/a | 1 |

In Table 1, the values are rounded to the nearest integer. Under the brute-force method, when there are more than 10 record groups involved, the time required to modify the access sequence exceeded the total seek time reduction effect, which will be explained more fully below. In comparison, the present method may be used to modify the access sequence in a minimal amount of time even when the number of record groups exceeds 1,000.

As the simulation was conducted on a laptop computer, and not on an actual tape drive, an implementation of the present method on a tape drive is expected to produce slightly different results in the correlation between the number of record groups and the time required for sequence modification, although the general trends are expected to remain the same.

Tables 2 and 3 show differences in total seek time between the brute-force method and the present method, using the record number sequence for baseline comparison. As explained above, 1,000 randomly generated sets were prepared for each record group quantity, and the average reduction time in each set was used for comparison. Reduction rate corresponds to the percentage of seek time reduced by the various methods.

TABLE 2

Reduction via the brute-force method

| No. of groups | Conventional | Brute-force | Reduction | Per group | Reduction rate |
|---|---|---|---|---|---|
| 8 | 112 | 68 | 44 | 5.5 | 39 |

In Tables 2 and 3, "No. of groups" refers to the number of record groups accessed consecutively. "Conventional" refers to the average total seek time for 1,000 sets accessed according to the record number sequence (i.e., in seconds). "Brute-force" refers to the average total seek time for 1,000 sets when the access sequence is modified via the brute-force method (i.e., in seconds). "Reduction" refers to the difference in average total seek time between the conventional method and the brute-force method (i.e., in seconds). "Per group" refers to the difference in seek time per record group (i.e., in seconds). "Reduction rate" refers to the percentage of seek time reduced by the brute-force method compared to the conventional method (i.e., a percentage).

TABLE 3

Reduction via the present method

| No. of groups | Conventional | Present method | Reduction | Per group | Reduction rate |
|---|---|---|---|---|---|
| 8 | 112 | 74 | 38 | 4.8 | 34 |
| 16 | 191 | 113 | 78 | 4.9 | 41 |
| 32 | 327 | 172 | 155 | 4.8 | 47 |
| 64 | 614 | 256 | 358 | 5.6 | 58 |
| 128 | 1193 | 398 | 795 | 6.2 | 67 |
| 512 | 4592 | 1011 | 3581 | 7.0 | 78 |
| 1024 | 9114 | 1716 | 7398 | 7.2 | 81 |

In Table 3, "Present method" refers to the average total seek time for 1,000 sets when the access sequence is modified via the present method (i.e., in seconds). "Reduction" refers to the difference in average total seek time between the conventional method and the present method (i.e., in seconds).

Let us first consider the case of eight record groups. Tables 2 and 3 show that the brute-force method and the present method produce shorter total seek times (44 seconds and 38 seconds, respectively) than the conventional record number access sequence. Thus, total seek time, including the time required to modify the access sequence, may be reduced by applying the brute-force method, provided that the time required to modify the access sequence is six seconds or less, or by using the present method when modifying the access sequence takes more than six seconds.

Next, Table 3 shows that the larger the number of record groups, the more significant the difference in the reduction of per-record group seek time. Thus, the larger numbers of record groups afford more leeway to modify the access sequence. When the number of record groups exceeds 1,000, the total seek time may be reduced by over 80%.

In order to confirm the differences between the results of the simulation and actual seek operations performed using a tape drive, tests were performed using an an LTO-5 tape drive. The tests used positional information generated randomly for eight record groups. Results demonstrated an error of approximately 10% and are shown in Table 4.

TABLE 4

Differences between simulation results measured results

| | Calculated value (seconds) | Measured value (seconds) |
|---|---|---|
| Record number sequence | 141 | 138 |
| Brute-force method | 81 | 90 |
| Present method | 115 | 125 |

As explained above, the simulation ignored the time required for acceleration and deceleration and assumed a consistently fast speed, so the calculated values were expected to be shorter than measured values.

However, as shown by the record number sequence in Table 4, the calculated values were unexpectedly slow. A comparison of calculated values and measured values for the time required to move between record groups indicated that calculated values were longer than measured values when moving between record groups on different bands. When moving a significant distance in the longitudinal direction, an actual tape drive is able to move to a different data band without affecting the time required for longitudinal movement, but the simulation added in a constant time required for data band movement, regardless of longitudinal position.

Thus, in an implementation of the present method, it may be possible to reduce the difference between calculated values and measured values by giving consideration to acceleration/deceleration time, as well as to the correlation between longitudinal distance and the time required for moving between data bands.

Differences between simulation results and measured values are likely to occur at roughly the same frequency when using the record number sequence, brute-force method, or the present method, so the differences are not believed to affect the aforementioned results of evaluations of the averages of 1,000 sets.

By using the present method, it may possible to significantly reduce total seek time, particularly when many record groups are involved. To users of tape drives that use file systems or VTSs, however, the important factor is not the difference in total seek time, but the difference in the time required for defrag and reclamation operations. The following discussion, using VTS as an example, investigates how the present method affects the time required for reclamation.

It is assumed that the VTS tape media (e.g., 1 TB) contains 2,560 logical volumes (e.g., 400 MB each). Additionally, 80% of the logical volumes are expired, and the remaining 20% (i.e., 512 logical volumes) are to be copied to a different tape media, while the original volume is emptied. This process is called reclamation. The speeds at which the tape drive reads and writes data on the tape media are identical, and data written to the tape media during reclamation is written directly after the most recently written logical volume, without performing seek operations on each volume. Thus, when reading logical volumes during reclamation, seek operations to logical volumes scattered on the tape media form a bottleneck. In mathematical terms, the time required for reclamation tT may be represented as the sum of total seek time tR and total logical volume read time tV:

$$tT=tR+tV \quad (4)$$

According to Table 3, the value for total seek time tR is 4,592 seconds when reading in the conventional record number sequence, or 1,011 seconds when using the present method.

Assuming a tape drive data transfer rate of 140 (MB/sec), the total time (i.e., in seconds) required to read 512 logical volumes (i.e., 400 MB each) tV may be represented as follows.

$$tV=400/140*512=1,463 \quad (5)$$

Table 5 is a comparison of the time required for reclamation using the conventional method and the present method, based on the information above.

TABLE 5

Reduction in time required for reclamation

| | Time required (seconds) | Difference compared to conventional method (seconds) | Reduction rate (%) |
|---|---|---|---|
| Conventional method | 6055 | — | — |
| Present method | 2474 | 3581 | 59 |

It is thus evident that applying the present method reduces reclamation time in a typical VTS by roughly 60% (i.e., 1 hour in this example). Thus, the present method not only reduces total seek time, but may also be an effective tool for improving the performance of entire tape drive-based systems.

In summary, a concept has been presented, the distance between record groups, which may be used to modify the record group access sequence. In simulation testing, this method reduced total seek time by approximately 80% and was especially effective when large quantities of record groups were involved. The method's ability to reduce total seek time, one of the prominent performance disadvantages of tape drives, is also useful in reducing the time required for defrag and reclamation operations when using a file system or VTS.

Figure 5:
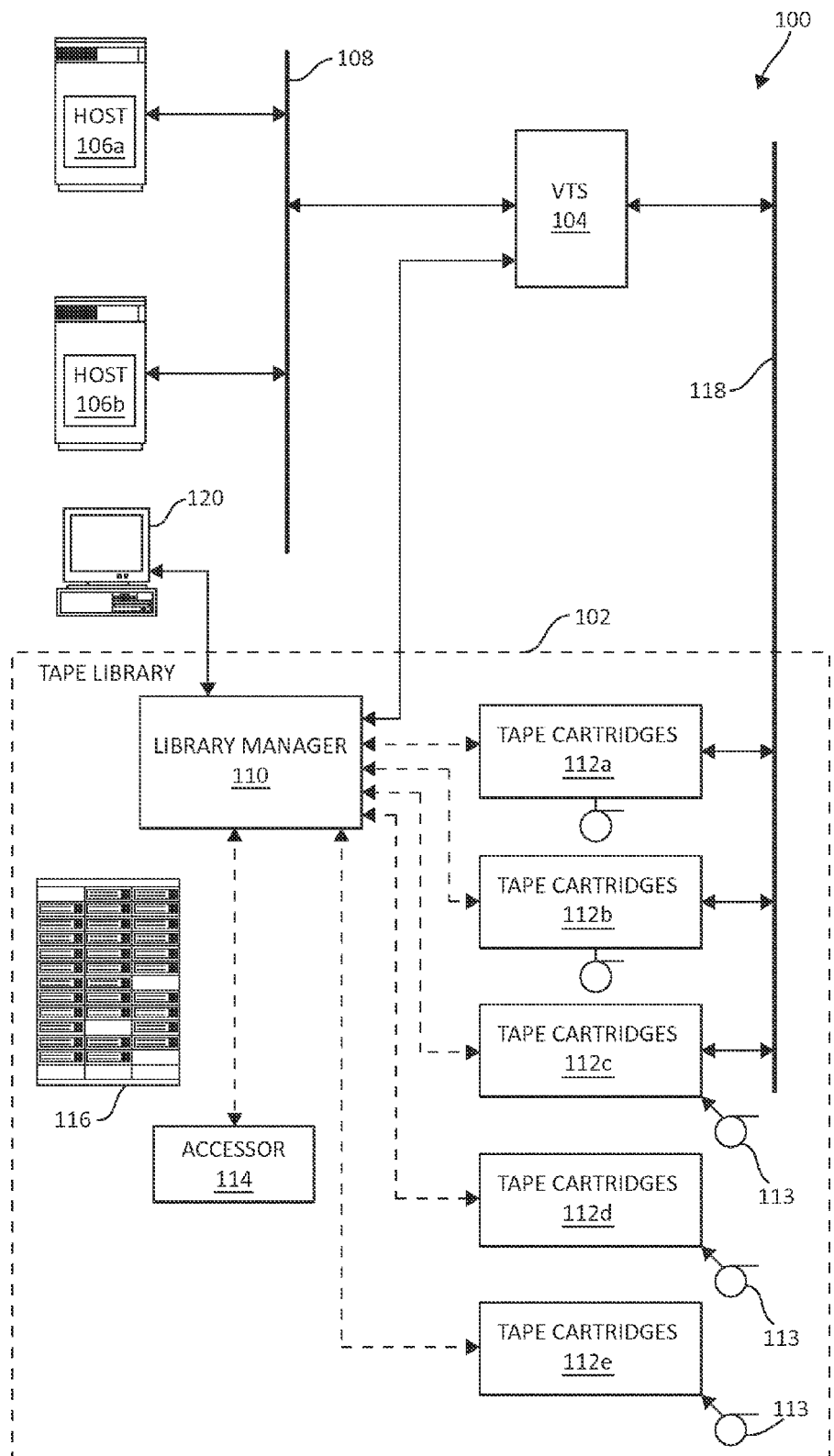
FIG. 5 is a schematic block diagram of an exemplary embodiment of a representative virtual tape system.

FIG. 5 illustrates an exemplary embodiment of a representative VTS system 100, which may be used in accordance with the present invention. The system 100 includes a tape library 102, at least one VTS 104 (primary cache), and at least one host 106 (shown as 106a and 106b). Each host 106 may be a mainframe computer. Alternatively, the host (users) 106 may be servers or personal computers using a variety of operating systems. The host 106 and the VTS 104 are connected via a storage area network (SAN) 108 or another suitable communications channel, for example, an Enterprise System Connection (ESCON) channel used in IBM mainframe computers.

The tape library 102 may include a library manager 110, one or more data drive devices, which may be tape cartridges 112 (secondary cache shown as 112a-e), an accessor 114, and a plurality of mountable media 116. In one embodiment, the mountable media 116 includes tape cartridges, magnetic disks, optical disks, CDs, DVDs, other devices that can store data and be mounted to a drive unit, and the like. The library manager 110, which includes at least one computing processor, may be interconnected with and may control the actions of the tape cartridges 112 and the accessor 114. The configuration of the library manager 110 will be shown and described in greater detail below. The mechanisms of the illustrated embodiments use two types of cache, a primary cache (VTS 104) and a secondary cache in the hierarchical storage management (HSM) system. Such configuration allows the VTS 104 to present to the user or host 106 a file on the disk cache as if it were a virtual tape and the user writes or reads data to or from the file. The file, as the virtual tape generated by the host, is later migrated to a real tape at an appropriate time. However, the mechanisms of the illustrated embodiments may provide for the real tape or tape cartridges to be real or virtual.

In FIG. 5, five tape cartridges 112a, 112b, 112c, 112d, and 112e are shown. The present invention is operable with one or more tape drives 113. The tape drives 113 are configured for assisting with the mounting and demounting user data and log data. The tape cartridges 112 may share one single repository of mountable media 116. Alternatively, the tape cartridges 112 may utilize multiple repositories of mountable media 116. The tape cartridges 112 may advantageously be distributed over multiple locations to decrease the probability that multiple tape cartridges 112 will be incapacitated by a disaster in one location.

The interconnections between the library manager 110, the tape cartridges 112, and the accessor 114 are shown as dashed lines to indicate that the library manager 110 transmits and receives control signals, rather than data to be stored or retrieved, to the tape cartridges 112 and/or the accessor 114. Data for storage or retrieval may instead be transmitted directly between the VTS 104 and the tape cartridges 112 via a network 118, which may be a storage area network, (SAN), local area network (LAN), wide area network (WAN), or another suitable type of network, including the Internet or a direct connection between the VTS 104 and the tape cartridges 112 via a point to point or multi-drop buss connection, for example, a Small Computer Storage Interface (SCSI) interface. Alternatively, control signals for tape drives 112 can be transmitted and received through connections between the VTS 104 and the library manager 110 and the VTS 104 and the tape drives 112 via network 118.

The accessor 114 may be a robotic arm or another mechanical device configured to transport a selected mountable media 116 between a storage bin and tape cartridges 112. The accessor 114 typically includes a gripper and a bar code scanner, or a similar read system, mounted on the gripper. The bar code scanner is used to read a volume serial number (VOLSER) printed on a cartridge label affixed to the tape cartridge 112. In alternative embodiments, the tape cartridges 112 may be replaced by optical disk drives or other magnetic drives. Similarly, the mountable media 116 and the tape drive 113 may include magnetic media, optical media, or any other removable media corresponding to the type of drive employed. A control console 120 may be connected to the library manager 110. The control console 120 may be a computer in communication with the library manager 110 so that a user can control the operating parameters of the tape library 102 independently of the host 106.

In addition, the described exemplary embodiment may be implemented by various means, such as hardware, software, firmware, or a combination thereof operational on or otherwise associated with the computing environment. For example, the method 100, as well as the following illustrated exemplary methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

Figure 6:
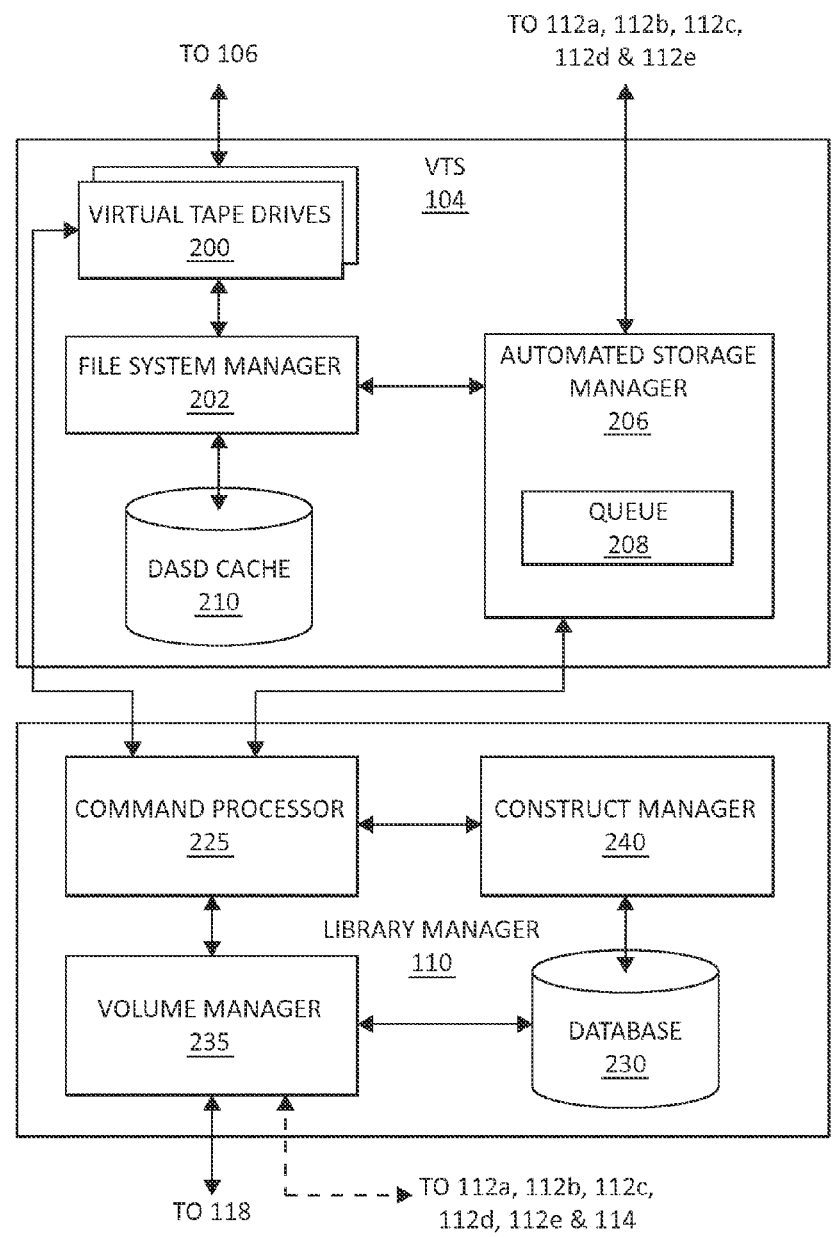
FIG. 6 is a block diagram of an exemplary embodiment of a virtual tape server (VTS) and library manager.

FIG. 6 illustrates a schematic block diagram depicting one embodiment of the VTS 104 and one embodiment of the library manager 110 of FIG. 1. The VTS 104 and the library manager 110 may each take the form of a computer with a bus, processor, memory, and the like. These elements have been omitted from FIG. 6 to more clearly depict the various executable modules and data blocks of the VTS 104 and the library manager 110 pertinent to the invention. There could also be other executable modules and data blocks known in the art in implementing a VTS 104 or library manager 110, but are omitted to focus on the elements essential to the invention.

As shown, the VTS 104 includes a plurality of virtual tape drives 200, a file system manager 202, an automated storage manager 206, a queue 208, and at least one direct access storage device (DASD) cache 210. The DASD cache 210 temporarily stores data from the host 106 on virtual or logical volumes in the form of files, and may thus be referred to as a primary cache. A write command from the host 106 is processed by the VTS 104, through a virtual tape drive 200 into the DASD cache 210, prior to transferring the updated logical volume from the DASD cache 210 to the mountable media or physical volume 116 (FIG. 5). According to one example, the DASD cache 210 takes the form of one or more hard disk drives, which may be arranged in a redundant array of independent drives (RAID configuration), such as RAID 5. The virtual tape drives 200 also process control commands from host 106.

The file system manager 202 manages and coordinates data storage in the DASD cache 210. The automated storage manager 206 controls the interface communications between the file system manager 202 and the tape cartridges 112. The automated storage manager 206 also controls communications between the VTS 104 and the library manager 110. In one embodiment, the host 106 may request a particular logical volume. The automated storage manager 206 determines whether the logical volume is in the DASD cache 210. If it is not, the automated storage manager 206 requests a recall for it from the physical volume or mountable media 116. The automated storage manage 206 may also contain a queue 208 for temporarily placing additional recall requests to be processed. Thus, the automated storage manager 206 is an apparatus for recalling logical volumes from mountable media 116 by means of the tape drives 112 a, b, c, d, and e (FIG. 5).

The library manager 110 manages the virtual and physical volumes as well as the constructs. More specifically, the library manager 110 includes the command processor 225 that receives control commands from the virtual tape drives 200 and the automated storage manager 206. The command processor 225 passes instructions about the management of the virtual and physical volumes to the volume manager 235. The volume manager 235 stores information about the virtual and physical volumes on a database 230 of the library manager 110. In addition, depending on the instructions received, the volume manager sends instructions to the tape cartridges 112 and/or the accessor 114 to load or "mount" the cartridges or other mountable media 116 on which copies of the virtual volume are to be made or retrieved. Mounting of multiple cartridges 116 may be generally simultaneous or in a certain order, depending on the configuration of the accessor 114 and the tape cartridges 112.

The library manager 110 also has a construct manager 240 that receives user instructions from the control console 120 regarding the volume management actions to be followed for a given construct name. The volume management actions are stored and retrieved by the construct manager 240 on a database 230 of the library manager 110. For certain control commands received by the command processor 225, the command processor 225 instructs the construct manager 240 to provide the volume management actions for a specific virtual volume. The command processor 225 then passes the returned volume management actions for a specific virtual volume to the automated storage manager 206.

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions (i.e., executable portions) for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A computer system comprising:
   a non-transitory computer-readable medium; and
   a processor in operable communication with the non-transitory computer-readable medium, the processor being adapted to:
   select a first data group in an access sequence of a plurality of data groups stored on a tape medium based on which data group in the plurality of data groups has a beginning closest to a current position of the tape medium;
   select a second data group in the access sequence based on which remaining data group in the plurality of data groups has a beginning closest to an end of the first data group in the access sequence;
   modify the access sequence to generate a modified access sequence based on which position of the last data group in the access sequence corresponds to a shortest total seek time;
   repeat the modifying of the access sequence until the modified access sequence is the same as the previous modified access sequence; and
   calculating a plurality of total seek times for the access sequence based on a time required to move between the plurality of data groups.

2. The computer system of claim 1, wherein the processor is further adapted to select an nth data group in the access sequence based on which remaining data group in the plurality of data groups has a beginning closet to an end of an (n−1)th data group in the access sequence.

3. The computer system of claim 2, wherein the n-th data group is a last data group in the access sequence if there are no remaining data groups in the plurality of data groups.

4. The computer system of claim 3, wherein the processor is further adapted to calculate the plurality of total seek times for the access sequence with each of the plurality of total seek times corresponding to a different position of the last data group in the access sequence.

5. A computer program product for determining an access sequence of a plurality of data groups stored on a tape medium, a non-transitory computer-readable storage medium having computer-readable program code portions stored thereon, the computer-readable program code portions comprising:
- a first executable portion that selects a first data group in the access sequence based on which data group in the plurality of data groups has a beginning closest to a current position of the tape medium;
- a second executable portion that selects a second data group in the access sequence based on which remaining data group in the plurality of data groups has a beginning closest to an end of the first data group in the access sequence;
- a third executable portion that modifies the access sequence to generate a modified access sequence based on which position of the last data group in the access sequence corresponds to a shortest total seek time;
- a fourth executable portion that repeats the modifying of the access sequence until the modified access sequence is the same as the previous modified access sequence; and
- a fifth executable portion that calculates a plurality of total seek times for the access sequence based on a time required to move between the plurality of data groups.

6. The computer program product of claim 5, further comprising a sixth executable portion that selects an nth data group in the access sequence based on which remaining data group in the plurality of data groups has a beginning closet to an end of an (n−1)th data group in the access sequence.

7. The computer program product of claim 6, wherein the n-th data group is a last data group in the access sequence if there are no remaining data groups in the plurality of data groups.

8. The computer program product of claim 7, further comprising a seventh executable portion that calculates the plurality of total seek times for the access sequence with each of the plurality of total seek times corresponding to a different position of the last data group in the access sequence.

* * * * *